US005584180A

United States Patent [19]

[11] Patent Number: 5,584,180

[45] Date of Patent: Dec. 17, 1996

Plettner et al.

[54] HYDRAULIC DEVICE FOR OPERATING AT LEAST ONE LINEARLY MOVABLE COMPONENT

[75] Inventors: Horst Plettner, Hanau; Rudi Weingärtner, Hasselroth, both of Germany

[73] Assignee: ABB Patent GmbH, Mannheim, Germany

[21] Appl. No.: 344,488

[22] Filed: Nov. 23, 1994

[30] Foreign Application Priority Data

Nov. 25, 1993 [DE] Germany .......................... 43 40 142.2

[51] Int. Cl.[6] ...................................................... F16D 31/02

[52] U.S. Cl. .................................................. 60/413; 60/484

[58] Field of Search ................................. 91/459, 170 R; 60/413, 484; 92/110

[56] References Cited

U.S. PATENT DOCUMENTS 4,748,897 6/1988 Hoge et al. ........................... 91/459 X
4,754,693 7/1988 Teltscher ............................... 91/459 X
5,018,431 5/1991 Gray et al. ............................. 91/459 X
5,236,057 8/1993 Takehara et al. ..................... 91/459 X
5,251,535 10/1993 Lacher et al. ......................... 91/459 X

FOREIGN PATENT DOCUMENTS 1148626 5/1963 Germany .

OTHER PUBLICATIONS

ABB Publ. No. 9, 1992, pp. 434–439, "Schaltanlagen" (Switching Stations).
DE–Publ. Elektrie, No. 4, 1992, pp. 161–164, "Weiterentwicklung der Antriebstechnik für SF6–Hoch . . . ".

*Primary Examiner*—Hoang Nguyen

[57] ABSTRACT

A hydraulic device for operating at least one linearly movable component, especially a movable contact piece of a medium-voltage or high-voltage power circuit breaker, includes a piston-cylinder configuration being assigned to the at least one component. A high-pressure reservoir supplies a hydraulic fluid at high pressure to the piston-cylinder configuration. A low-pressure reservoir is provided for the hydraulic fluid. A pump conveys the hydraulic fluid from the low-pressure reservoir to the high-pressure reservoir. A central distribution device is connected to the at least one component and has at least one line for the hydraulic fluid at high pressure and at least one line for the hydraulic fluid at low pressure.

11 Claims, 2 Drawing Sheets

(X)

HYDRAULIC DEVICE FOR OPERATING AT LEAST ONE LINEARLY MOVABLE COMPONENT

BACKGROUND OF THE INVENTION

Field of the Invention

The invention relates to a hydraulic device for operating at least one linearly movable component, especially a movable contact piece of a medium-voltage or high-voltage power circuit breaker, having one piston-cylinder configuration assigned to the at least one component in each case, a high-pressure reservoir from which a hydraulic fluid can be supplied to the piston-cylinder configuration at high pressure, a low-pressure reservoir for the hydraulic fluid, and a pump conveying the hydraulic fluid from the low-pressure reservoir to the high-pressure reservoir.

Such a hydraulic device is used especially for operating the moving contact pieces of a high-voltage power circuit breaker, with the term high voltage also being understood to cover the field of medium voltage. Such a power circuit breaker can be constructed as a gas-insulated, especially $SF_6$-insulated, metal-encapsulated switch or as an open-air switch. Drives for operating each power circuit breaker or the moving contact piece of one pole or a plurality of poles of the power circuit breaker in each case have an energy store which can be constructed as a spring store and have energy which is released to operate the moving contact piece. For that purpose, the energy store or storage device is integrated in a hydraulic device, and the moving contact piece or pieces is or are connected to an operating piston in each case. The hydraulic energy is supplied to the operating piston on both sides, both into a space having a larger area and into a space having a smaller area, so that in consequence the piston is moved into a switch position. By operating a suitable changeover valve, the space which is bounded by the larger piston area is connected to a low-pressure container, as a result of which the piston can be displaced suddenly and the moving contact piece can be moved into the switched-off position.

In the case of the known drives, a pipeline system having an assembly which is relatively complicated is located between the store, the charging unit, which is constructed as a pump, and the operating unit, that is to say the operating piston.

SUMMARY OF THE INVENTION

It is accordingly an object of the invention to provide a hydraulic device for operating at least one linearly movable component, which overcomes the hereinafore-mentioned disadvantages of the heretofore-known devices of this general type and which is considerably simplified in comparison with the known device.

With the foregoing and other objects in view there is provided, in accordance with the invention, a hydraulic device for operating at least one linearly movable component, especially a movable contact piece of a medium-voltage or high-voltage power circuit breaker, comprising, in each case, a piston-cylinder configuration being assigned to the at least one component; a high-pressure reservoir for supplying a hydraulic fluid at high pressure to the piston-cylinder configuration; a low-pressure reservoir for the hydraulic fluid; a pump for conveying the hydraulic fluid from the low-pressure reservoir to the high-pressure reservoir; and a central distribution device being connected to the at least one component and having at least one line for the hydraulic fluid at high pressure and at least one line for the hydraulic fluid at low pressure.

In accordance with another feature of the invention, the central distribution device is constructed as a distribution rail which has a rectangular cross-section and is elongated, and the lines for hydraulic fluid at high pressure and at low pressure are formed by two longitudinal holes which run parallel, within the distribution rail.

Through the use of this configuration, it is possible to dispense with pipelines which have to be laid between the energy store and the operating pistons and those components of the hydraulic device located in between.

A further advantage of the distribution rail is that it can also be used for holding the individual components at the same time.

In accordance with a further feature of the invention, the piston-cylinder configurations, that is to say the operating pistons, are mounted on a first lateral surface, control valves for driving the piston-cylinder configurations on an opposite, second lateral surface, and the high-pressure reservoir and/or the pump on a third lateral surface of the distribution rail running at right angles thereto, transverse holes, which are connected to the individual components and are fitted in the distribution rail, open into the associated longitudinal holes.

Thus, according to the invention, the distribution rail is used not only for distributing the hydraulic fluid but also for holding the individual components, so that the individual components together with the distribution rail form a unit which can be preassembled.

In accordance with an added feature of the invention, the distribution rail has a longitudinal extent, the piston-cylinder configuration and the control valves are each disposed in a plane perpendicular to the longitudinal extent of the distribution rail, and the high-pressure reservoir and the pump are disposed between the two adjacent planes. This provides a simplification of the configuration of the individual components on the distribution rail.

In accordance with an additional feature of the invention, the hydraulic device is flange-connected to a metal-encapsulated, gas-insulated switching installation, the piston-cylinder configuration is located between the distribution rail and the flange, and the control valves are mounted on a lateral surface of the distribution rail which faces away from the flange.

In accordance with yet another feature of the invention, the individual components are constructed like modules and are mounted on the distribution rail with a seal, which is identical for all of the connections and is interposed for connecting lines which lead to the high-pressure lines and low-pressure lines. Assembly and storage can be considerably simplified as a consequence.

In accordance with yet a further feature of the invention, the reservoir space in the energy store or high-pressure reservoir is directly adjacent the distribution rail, and an end wall of the reservoir space being opposite the larger piston area is formed by an adjacent side wall of the distribution rail.

In accordance with yet an added feature of the invention, in order to ensure that installation at this point and sealing are simplified, the high-pressure reservoir has a collar which engages in a depression in the side wall, with a seal being interposed.

In accordance with still another feature of the invention, the individual components are modules, the modules and the distribution rail have separating surfaces defining interfaces between the modules and the distribution rail, and there are provided sealing sleeves disposed at the interfaces, bridging the separating surfaces and having sealing elements on both sides of the separating surfaces.

In accordance with still a further feature of the invention, the sealing elements are each formed of an O-ring seal and a supporting ring.

In accordance with yet an additional feature of the invention, the distribution rail is formed of aluminum. Consequently, it has a relatively low weight, with adequate strength.

In accordance with again another feature of the invention, the distribution rail is an extruded profile with longitudinal holes being prepared in advance and incorporated therein, in such a way that only the transverse holes, with the associated seals and other connections, need be produced for further processing.

In accordance with a concomitant feature of the invention, there are provided adjusting slides being introduced into the longitudinal holes or specific transverse holes, by means of which a flow of the hydraulic fluid within the longitudinal holes or transverse holes are opposed by an adjustable resistance so that, in consequence, the movement of the operating piston can be adjusted, on one hand, and surges within the pressure fluid can be reduced or damped, on the other hand.

In addition, the simultaneous closure of the contacts of the high-voltage power circuit breaker can be adjusted.

Other features which are considered as characteristic for the invention are set forth in the appended claims.

Although the invention is illustrated and described herein as embodied in a hydraulic device for operating at least one linearly movable component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
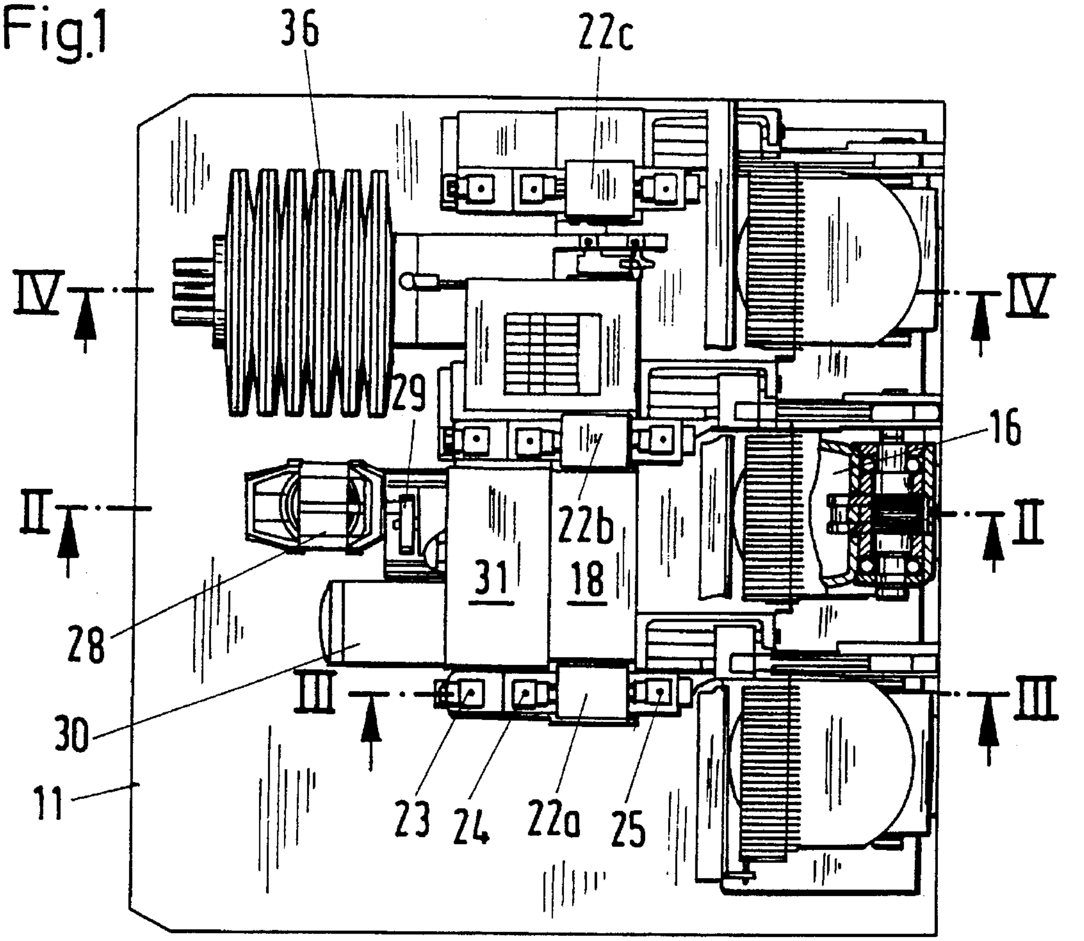
FIG. 1 is a diagrammatic, partly broken-away, plan view of a hydraulic device according to the invention.
Figure 2:
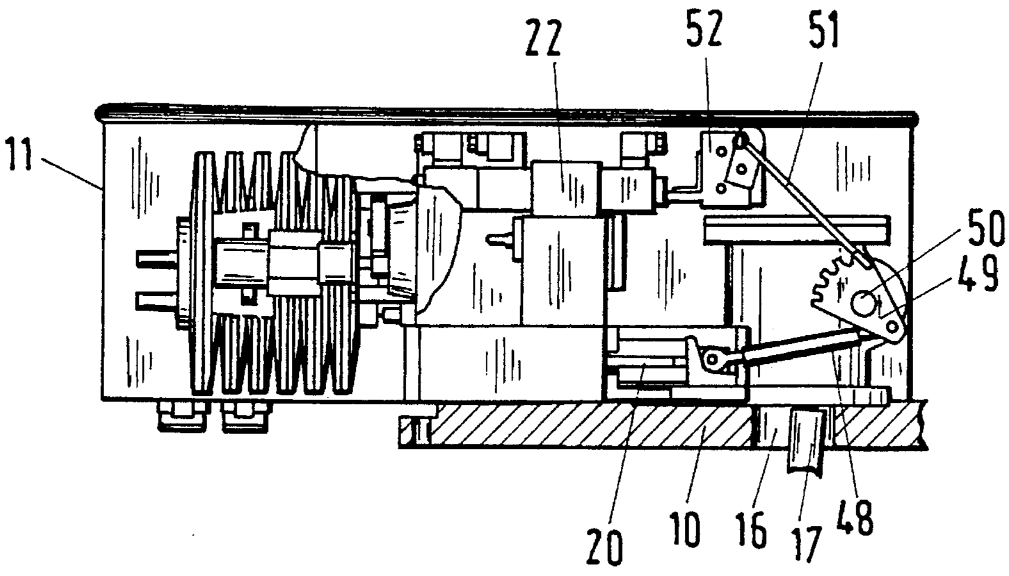
FIG. 2 is a sectional view taken along a line II—II of FIG. 1, in the direction of the arrows.

Referring now to the figures of the drawing in detail and first, particularly, to FIGS. 1 and 2 thereof, there is seen a housing 11, in which a hydraulic device for operating a power circuit breaker is disposed and is mounted on a flanged plate 10 that can be screwed against a non-illustrated open flange of a metal-encapsulated, gas-insulated switching installation, in the region of the power circuit breaker.

The flanged plate 10 has openings 16 (of which only one opening can be seen in FIG. 2) through which one drive rod 17 passes in each case. The drive rods 17 are connected to respective moving contact pieces of individual power circuit breaker poles.

Seated on the flanged plate 10 is the hydraulic device which has a distribution rail 18 of essentially square cross-section (FIG. 3) having a first lateral surface 19 on the flanged-plate side on which one operating piston unit or piston-cylinder configuration 20 is mounted in each case and having a second opposite lateral surface 21 facing away from the flange on which one changeover valve 22 is mounted in each case for each power circuit breaker pole. Since one power circuit breaker has a total of three power circuit breaker poles, three operating piston units and three changeover valves 22*a*, 22*b* and 22*c* are also provided, as is seen in FIG. 1. As can be seen in FIG. 1 and more clearly in FIG. 3, in each case one electromagnetic system 23, 24 for two switching-off circuits and one electromagnetic system 25 for one switching-on circuit is assigned to the individual changeover valves 22*a*, 22*b* and 22*c*.

Figure 3:
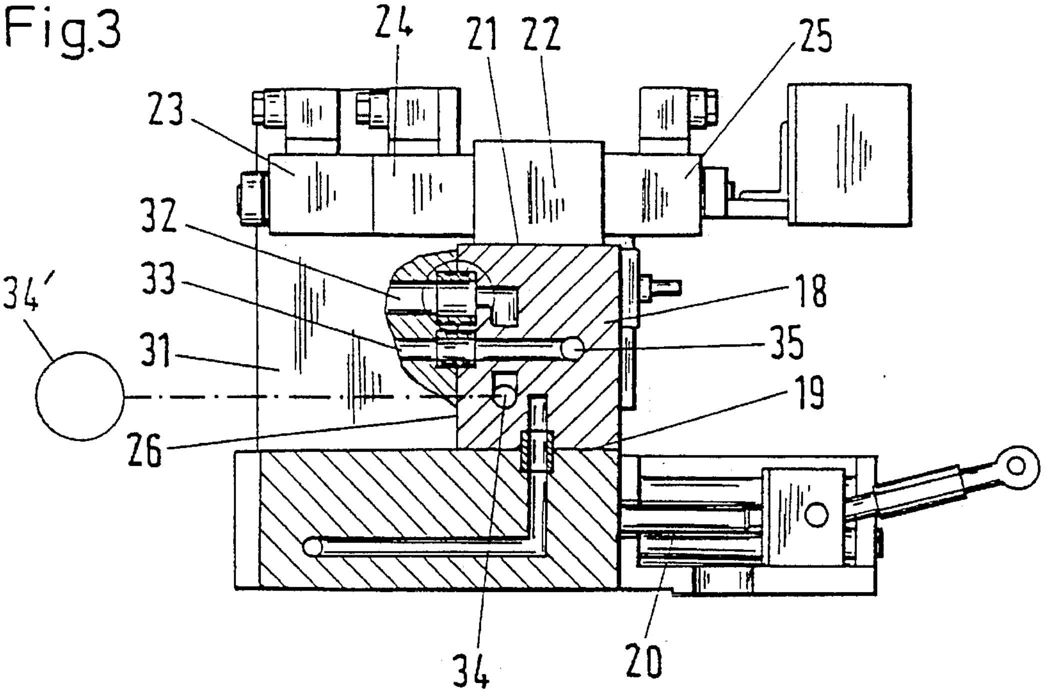
FIG. 3 is a sectional view of a distribution rail taken along a line III—III of FIG. 1, in the direction of the arrows.

A motor-pump unit is located between the two changeover valves 22*a* and 22*b*, on a third lateral surface 26 which runs at right angles to the flanged plate 10 and is located on the left in FIG. 3. The motor-pump unit has a drive motor 28 for a pump 29, which is only illustrated diagrammatically, and a filter unit 30, which are connected to a motor-pump block 31 having connecting holes 32, 33 which are disposed therein and in each case have a respective longitudinal hole 34, 35 within the distribution rail 18 of a central distribution device. In this case, the longitudinal hole 34 is connected to a schematically-illustrated low-pressure collector tank or reservoir 34' and the longitudinal hole 35 is connected to an energy store (discussed further below) serving as a high-pressure reservoir, so that the pump sucks in hydraulic fluid from a low-pressure tank or reservoir through the connecting line or connecting hole 32, and feeds pressure fluid through the connecting line 33 to the longitudinal hole 35.

Figure 4:
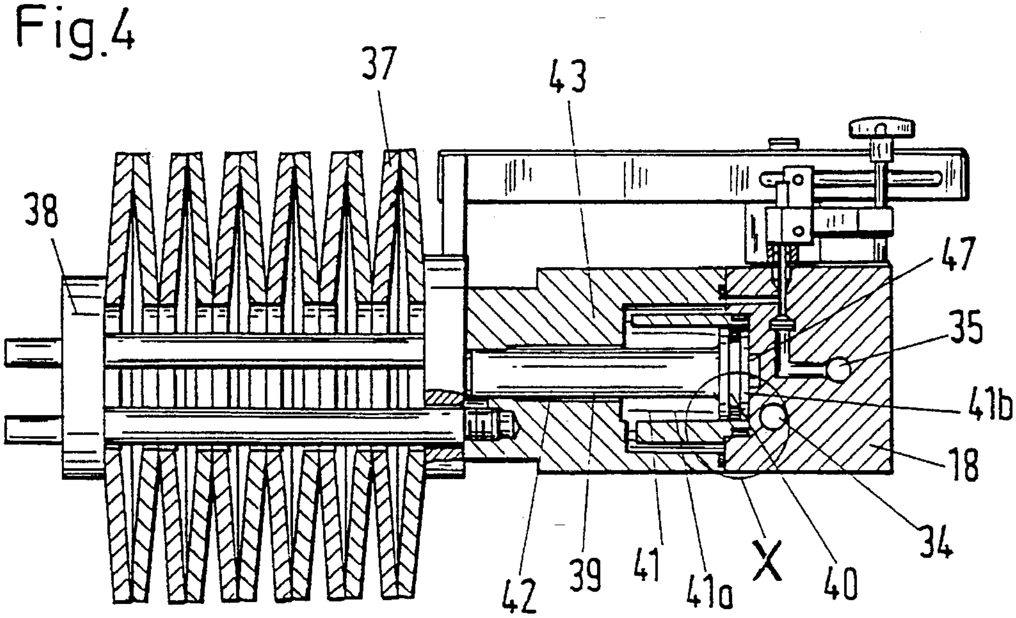
FIG. 4 is a sectional view taken along a line IV—IV of FIG. 1, in the direction of the arrows.
Figure 5:
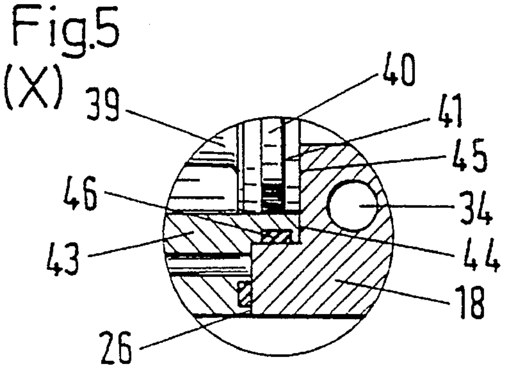
FIG. 5 is an enlarged view of a portion X of FIG. 4.

An energy store 36, which is shown in FIG. 1 but is illustrated in more detail in FIG. 4, is located on the lateral surface 26, in the region between the changeover valves 22*b* and 22*c*. Storage elements 37 of the energy store 36 are a plurality of disc springs which are connected in a row, one behind the other. A retaining disc 38 is located at an end of the disc springs 37 which located opposite the distribution rail 18. A piston 40 is disposed in a cylinder or reservoir space 41. A space 41*a* to the left of the piston 40, that is to say the space having the smaller piston area, and a space 41*b* to the right of the piston 40, that is to say the space having the larger piston area, contain pressure fluid on both sides. The piston space 41 and a hole 42 which guides a piston rod 39 are accommodated in a cylinder block 43 which is mounted on the distribution rail 18. The distribution rail 18 itself bounds the piston space 41 on the side opposite the larger piston area. For this purpose, the cylinder block 43 has a collar-like projection 44 which limits the piston space 41 and engages in a depression 45 on the lateral surface 26 of the distribution rail 18, as is seen in FIG. 5. It is self-evident that the collar or the collar-like projection 44 on its outside has an annular seal 46 by means of which sealing is produced. In the enlarged detail of FIG. 5 it is possible to see the longitudinal hole 34 which is connected to the low-pressure container, tank or reservoir. A transverse hole 47 runs from the space 41*b* towards the longitudinal hole 35. The longitudinal hole 34 is connected to the space 41*a* through additional transverse holes (without reference numerals) in the distribution rail 18 and in the cylinder block 43 so that emerging leakage oil from the piston 40 is carried away to the low-pressure container. Elements 36–42 serve as the high-pressure reservoir.

FIGS. 2 and 3 show that the operating piston unit 20 is connected to a bell crank 49 through an intermediate element 48. The bell crank 49 is mounted on a switching shaft 50 and the rod 17 is connected to this switching shaft. The bell crank is connected to an auxiliary switch 52 through a further intermediate element 51.

Figure 6:
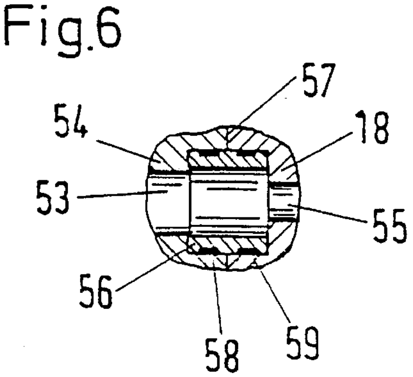
FIG. 6 is a fragmentary, sectional view of a region of a transition between the distribution rail and an attached component, which illustrates sealing.

As is seen in FIG. 6, a seal between two components, for example a seal between a hole 53 in a module 54 which can be fitted on the distribution rail 18, and a transverse hole 55 in the distribution rail, is produced by means of a bush or sealing sleeve 56 which connects or engages over a separating joint or surface 57 between the two parts. Annular seals or sealing elements 58, 59 are fitted in the bush 56, on both sides of the separating joint 57. The sealing elements 58, 59 are each formed of an O-ring seal and a supporting ring.

An internal interconnection of the changeover valves 22 to the longitudinal holes 34 and 35 and/or to the piston space 41*b* and the operating piston unit 20 is known per se, so that there is no need to describe it in more detail herein.

We claim:

1. A hydraulic device, comprising:

at least one linearly movable individual component;

a piston-cylinder configuration being assigned to said at least one component;

a high-pressure reservoir for supplying a hydraulic fluid at high pressure to said piston-cylinder configuration;

a low-pressure reservoir for the hydraulic fluid;

a pump for conveying the hydraulic fluid from said low-pressure reservoir to said high-pressure reservoir; and a central distribution device being connected to said at least one component and having at least one line for the hydraulic fluid at high pressure and at least one line for the hydraulic fluid at low pressure, said distribution device including an elongated distribution rail having a rectangular cross-section having longitudinal holes formed therein defining said high-pressure and low-pressure lines; and control valves for driving said piston-cylinder configuration;

said distribution rail having a first lateral surface on which said piston-cylinder configuration is mounted, an opposite, second lateral surface on which said control valves are mounted, and a third lateral surface being perpendicular to said first and second lateral surfaces, said high-pressure reservoir and said pump being mounted on said third lateral surface, and said distribution rail having transverse holes formed therein being connected to said longitudinal holes.

2. The hydraulic device according to claim 1, wherein said distribution rail has a longitudinal extent, said piston-cylinder configuration and said control valves are disposed mutually opposite one another as seen perpendicularly to the longitudinal extent of said distribution rail, and said high-pressure reservoir and said pump are disposed offset from said piston-cylinder configuration and said control valve along the longitudinal extent of said distribution rail.

3. The hydraulic device according to claim 1, including a flange to be connected to a gas-insulated switching installation, said piston-cylinder configuration being mounted on said distribution rail facing toward said flange, and said control valves being mounted on said distribution rail facing away from said flange.

4. The hydraulic device according to claim 1, including connections and connecting lines leading to said high-pressure and low-pressure hydraulic fluid lines, being mounted on said distribution rail with a seal being identical for all of said connections and being interposed for said connecting lines.

5. The hydraulic device according to claim 1, wherein said high-pressure reservoir has a reservoir space being adjacent said distribution rail, and said distribution rail has an adjacent side wall forming an end wall of said reservoir space.

6. The hydraulic device according to claim 5, wherein said high-pressure reservoir has a collar being engaged in a depression formed in said side wall with a seal being disposed between said collar and said side wall at said depression.

7. The hydraulic device according to claim 1, wherein said connections and connecting lines and said distribution rail have separating surfaces defining interfaces between each other, and including sealing sleeves disposed at said interfaces, bridging said separating surfaces and having sealing elements on both sides of said separating surfaces.

8. The hydraulic device according to claim 7, wherein said sealing elements are each formed of an O-ring seal and a supporting ring.

9. The hydraulic device according to claim 1, wherein said distribution rail is formed of aluminum.

10. The hydraulic device according to claim 1, wherein said distribution rail is an extruded profile having said longitudinal holes prepared in advance.

11. The hydraulic device according to claim 1, wherein said at least one linearly movable individual component is a movable contact piece of a medium-voltage or high-voltage power circuit breaker.

* * * * *